(12) United States Patent
Foidl

(10) Patent No.: US 11,981,868 B2
(45) Date of Patent: May 14, 2024

(54) CONTINUOUS REACTOR DEVICE AND PROCESS FOR TREATMENT OF BIOMASS

(71) Applicant: CARBONZERO SAGL, Astano (CH)

(72) Inventor: Nikolaus Foidl, Graz (AT)

(73) Assignee: CARBONZERO SAGL, Astano (CH)

( * ) Notice: Subject to any disclaimer, the term of this patent is extended or adjusted under 35 U.S.C. 154(b) by 259 days.

(21) Appl. No.: 17/599,630

(22) PCT Filed: Apr. 7, 2020

(86) PCT No.: PCT/EP2020/059861
§ 371 (c)(1),
(2) Date: Sep. 29, 2021

(87) PCT Pub. No.: WO2020/212198
PCT Pub. Date: Oct. 22, 2020

(65) Prior Publication Data
US 2022/0204860 A1    Jun. 30, 2022

Related U.S. Application Data

(60) Provisional application No. 62/834,038, filed on Apr. 15, 2019.

(51) Int. Cl.
| | |
|---|---|
| *C10B 57/02* | (2006.01) |
| *B01J 6/00* | (2006.01) |
| *B01J 19/00* | (2006.01) |
| *B01J 19/18* | (2006.01) |
| *C10B 5/00* | (2006.01) |
| *C10B 7/06* | (2006.01) |
| *C10B 49/06* | (2006.01) |
| *C10B 53/02* | (2006.01) |

(52) U.S. Cl.
CPC .............. *C10B 57/02* (2013.01); *B01J 6/008* (2013.01); *B01J 19/0013* (2013.01); *B01J 19/18* (2013.01); *C10B 5/00* (2013.01); *C10B 7/06* (2013.01); *C10B 49/06* (2013.01); *C10B 53/02* (2013.01); *B01J 2219/00157* (2013.01); *B01J 2219/182* (2013.01)

(58) Field of Classification Search
CPC .. C10B 5/00; C10B 7/06; C10B 49/06; C10B 53/02; C10B 57/02; B01J 6/008; B01J 19/0013; B01J 19/18
See application file for complete search history.

(56) References Cited

U.S. PATENT DOCUMENTS

| | | |
|---|---|---|
| 4,900,401 A | 2/1990 | Horton |
| 5,584,970 A | 12/1996 | Schmalfeld et al. |
| (Continued) | | |

FOREIGN PATENT DOCUMENTS

| | | |
|---|---|---|
| WO | 2018186806 A1 | 10/2018 |
| WO | 2019166873 A4 | 9/2019 |

*Primary Examiner* — Jonathan Miller
(74) *Attorney, Agent, or Firm* — GLOBAL IP COUNSELORS, LLP

(57) ABSTRACT

A continuous reactor device for treatment of biomass includes a biomass feed for introduction of the biomass or the feedstock to a reactor portion of the continuous reactor device. The reactor portion includes a compartment, a transport device for transportation of the biomass through the reactor portion, and a heating device for precise temperature-adjustment in the compartment in the reactor portion, is proposed.

21 Claims, 7 Drawing Sheets

(56) References Cited

U.S. PATENT DOCUMENTS

| | | | |
|---|---|---|---|
| 9,909,067 B2* | 3/2018 | Daugaard | C10C 5/00 |
| 10,961,459 B2* | 3/2021 | Seidner | C10G 1/04 |
| 11,345,860 B2* | 5/2022 | Seidner | C10L 5/447 |
| 11,674,086 B2* | 6/2023 | Seidner | C10B 57/06 |
| | | | 201/21 |
| 2006/0280669 A1 | 12/2006 | Jones | |
| 2010/0223839 A1* | 9/2010 | Garcia-Perez | C12M 45/20 |
| | | | 44/451 |
| 2011/0048918 A1* | 3/2011 | Strezov | C10B 53/02 |
| | | | 34/498 |
| 2013/0256113 A1* | 10/2013 | Tumiatti | C10B 49/14 |
| | | | 422/187 |
| 2013/0263499 A1* | 10/2013 | Monroe | C10L 9/083 |
| | | | 44/535 |
| 2016/0053181 A1* | 2/2016 | Ericsson | C10B 57/06 |
| | | | 202/257 |
| 2020/0056098 A1* | 2/2020 | Seidner | C10L 9/083 |

* cited by examiner

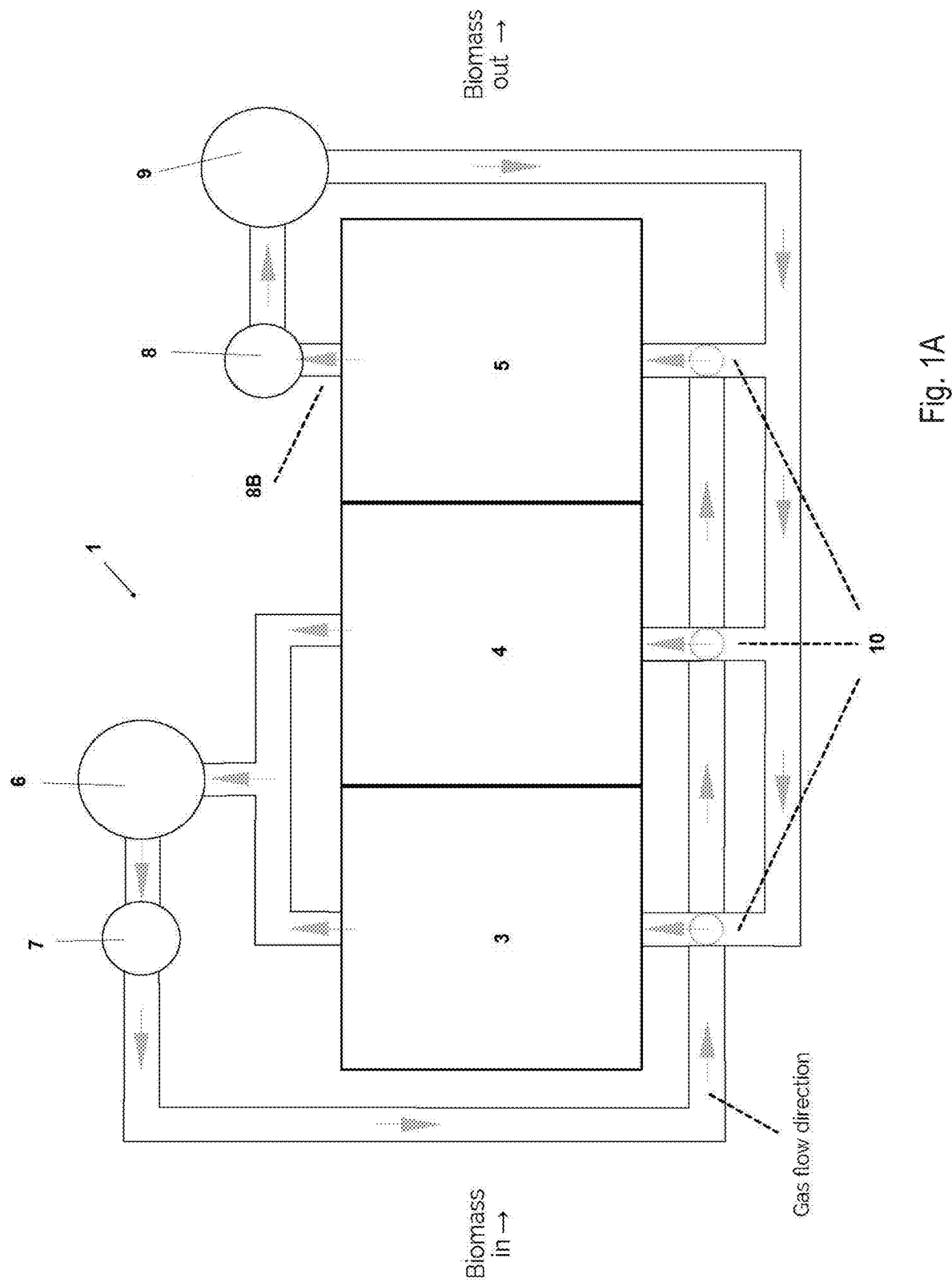

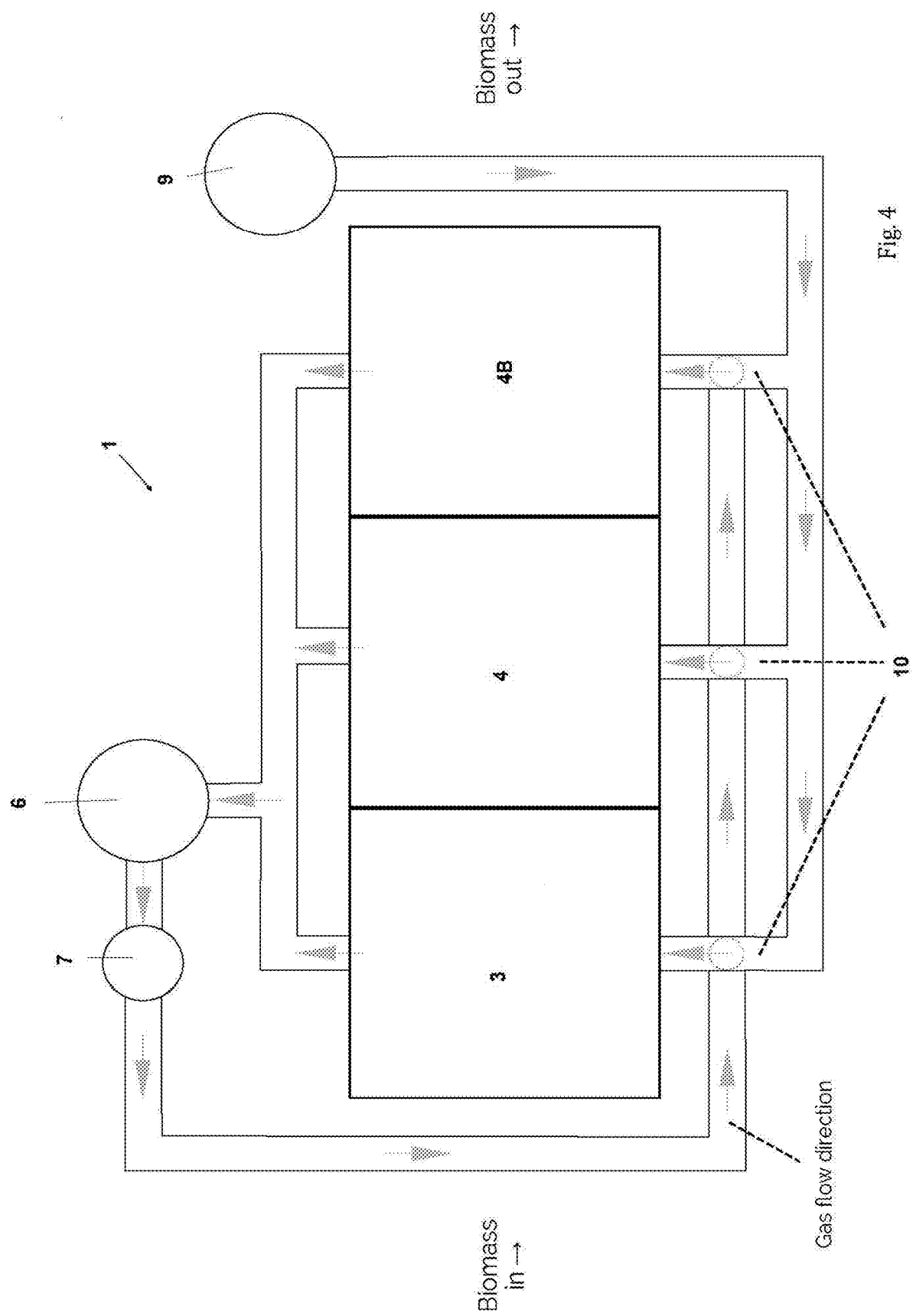

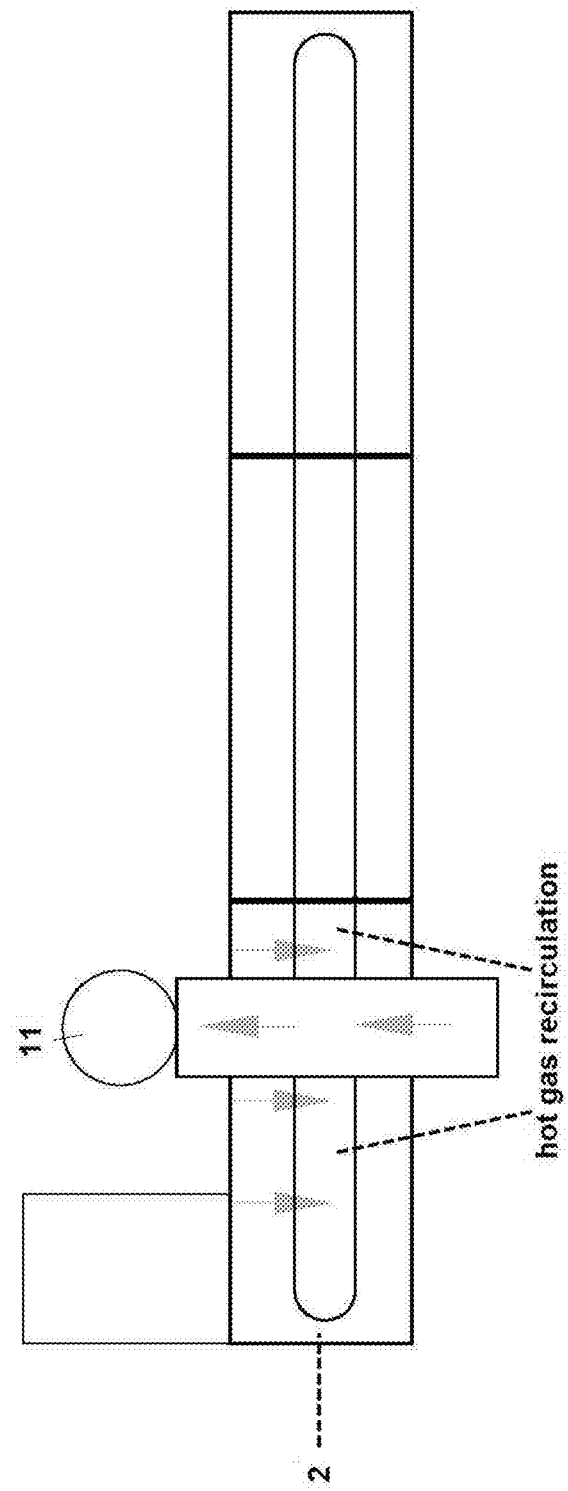

CONTINUOUS REACTOR DEVICE AND PROCESS FOR TREATMENT OF BIOMASS

CROSS-REFERENCE TO RELATED APPLICATIONS

This application is a U.S. National Stage application of International Application No. PCT/EP2020/059861, filed Apr. 7, 2020, which claims priority to U.S. Provisional Patent Application No. 62/834,038, filed Apr. 15, 2019, the contents of each of which are hereby incorporated herein by reference.

BACKGROUND

Field of the Invention

The invention relates to a continuous reactor device and a process for treatment of biomass.

Background Information

Conventional continuous pyrolysis reactor technologies are revealed in WO1999018171A1, which describes a closed-loop continuous operating pyrolysis system for processing rubber waste. U.S. Pat. No. 4,900,401A discloses a continuous pyrolysis system for tire shreds.

With regards to the processing of agricultural and forestry biomass, CN104017590B describes a continuous pyrolysis carbonization method assorted with a drying box and a unit to produce semi coke and then biomass charcoal, by using the semi coked volatiles and cooling so as to obtain tar, pyroligneous liquor and pyrolysis gas, and by using the pyrolysis gas to obtain a high-temperature flue gas recirculated into the device for heat supply.

DE102005005859B3 reveals a device, which is drying biomass in a drying chamber and subsequently subjects the dried biomass to a pyrolysis whereby the synthesis gas is combusted with the purpose to generate the required heat, supported by an auxiliary gas burner.

SUMMARY

However, it has been determined that the prior art does not provide an apparatus for an effective, efficient and preferably complete processing of biomass.

Starting from the state of the art it is an object of the invention to propose a reactor device and a process for treatment of biomass avoiding the disadvantages of the prior art. In particular, to provide a reactor device and a process for effective and efficient use of biomass residues by thermally transforming such biomass into separately usable products and generating volatile and extractable compounds in the course of such thermal biomass transformation.

The subject matter of the invention satisfying this object is characterized by the features described herein.

Thus, according to embodiments of the invention a continuous reactor device for treatment of biomass comprising a biomass feed for introduction of the biomass and/or the feedstock to a reactor portion of the continuous reactor device is proposed. The reactor portion comprises a compartment for treatment of the biomass, a transport device for transportation of the biomass through the reactor portion; and a heating device for precise temperature-adjustment in the compartment in the reactor portion. Therefore, biomass is fed to the continuous reactor device according to embodiments of the invention onto the transport device, wherein the biomass is transported through the reactor portion by the transport device and the biomass is heated to a precise temperature in the compartment with the heating device. A residence time of the biomass in the compartment can be set by a velocity of the transport device.

The continuous reactor device is in particular the entirety of the device that facilitates a thermochemical reaction to convert biomass into a variety of useful end products. The reactor portion is in particular the part of the continuous reactor device comprising one or more compartments that expose biomass to heated anoxic gas, especially the reactor portion is where the thermochemical reaction takes place, or the biomass is preheated or dried so that this reaction can occur in a subsequent compartment. The compartment is in particular a separate physical space into which a layer of biomass can be introduced and in which heated gas can flow past or through the biomass layer, wherein preferably the temperature and velocity of hot anoxic gas used to transfer heat to the biomass particles can be individually regulated in a precise manner. In a very preferred embodiment, the reactor portion comprises a plurality of separate compartments and the heating device is designed for separate temperature-adjustment in each of the compartments in the reactor portion, such that the temperature in each compartment can be precisely adjusted.

The continuous reactor device provides precise control over the exact temperature with which the biomass is treated (in particular treated in a specific compartment) and preferably also residence time in the compartment needed to produce a given end product (whether it is a solid or condensate or extraction). Therefore, an operator has full control over the temperature in the compartment and the device has the ability to apply heat in as many stages as needed.

In particular the continuous reactor device can comprise a horizontal flat bed kiln for introduction of the biomass to the reactor portion of the continuous reactor device. In the reactor portion the biomass is transported through the plurality of separate compartments with the transport device and the biomass is heated by a heating device which is designed for separate temperature-adjustment in each of the compartments of the reactor portion.

In an important embodiment the reactor portion comprises a drying compartment, a torrefaction compartment and a pyrolysis compartment. Furthermore, the plurality of separate compartments can comprise a gas circulation device or system for circulation of at least a part of an exhaust gas from the separate compartments.

However, the continuous reactor device can have any number of compartments. A continuous reactor device with a single compartment can be used as dedicated device to produce karrikins, hydrolactones and strigolactones, or to extract essential oils. A continuous reactor device with two compartments can be used for torrefaction. The continuous reactor device can also comprise a fourth compartment for steam extraction to obtain oil form the biomass. Such an extraction compartment can preferably be arranged in front of the drying compartment. The pyrolysis compartment (preferably the gas circulation device or system) can comprise a second gas circulation device for circulation of at least a part of an synthesis gas from the pyrolysis compartment. The drying compartment and the torrefaction compartment (preferably the gas circulation device or system) can comprise a first gas circulation device for circulation of at least a part of an anoxic gas from the drying compartment and the torrefaction compartment. The anoxic gas is a gas with a low amount of oxygen, such as an exhaust gas for example from the pyrolysis compartment.

The torrefaction compartment can be divided into multiple sub-compartments so that different fractions of organic compounds can be extracted from the feedstock heated to gradually increasing temperature ranges in the different sub-compartments of the torrefaction compartment. With such an arrangement chemical refining may be much easier. In particular a fractionated extraction of gases may be undertaken with multiple sub-compartments regulated at successively higher temps during in a range between 200 and 280° C.

Furthermore, it is preferred that the continuous reactor device is a horizontal continuous reactor device and the reactor portion and the transport device are of a horizontal orientation for horizontal transportation of the biomass through the compartments of the reactor portion.

In addition, the transport device can be designed as a moving scraper or a moving bed, especially a moving mesh bed. The heating device can comprise a burner. The burner is preferably an atmospheric burner and the burner can utilize a raw synthesis gas emitted from the pyrolysis compartment, or alternatively any other fuel or heat source, to provide the heat needed by the device (for example as part of the exhaust gas to be recirculated).

The continuous reactor device can utilize a cold gas source which is configured to provide a cold gas to the reactor portion, for precise temperature-adjustment with the heating device. The precise temperature-adjustment can be achieved due to mixing of a hot gas from the heating device and the cold gas from the cold gas source.

In a preferred embodiment gas-outlets can be separately attached to the drying compartment and/or the torrefaction compartment and/or the pyrolysis compartment. In a gas-flow direction, downstream of the gas-outlet of the drying compartment and/or the torrefaction compartment a condenser/heat exchanger is disposed for the condensation of the volatiles of the gas formable in the drying compartment and/or the torrefaction compartment. The condenser/heat exchanger can be used as the cold gas source. Therefore, the gases are vented from all compartments, in particular vented separately from each compartment to obtain the end products.

The pyrolysis compartment can be used/be designed as a second torrefaction compartment in a torrefaction configuration of the continuous reactor device.

The process for treatment of a biomass in a device according to an embodiment of the invention can additionally comprise the steps of:
 a. Providing a continuous reactor device according to the invention,
 b. Feeding the biomass to the continuous reactor device onto the transport device, wherein the biomass is transported through the reactor portion by the transport device,
 c. Drying the biomass in a drying compartment by providing an anoxic gas at a temperature of up to 220 degrees Celsius, which is recirculated through the drying compartment and a layer of the biomass,
 d. Moving the biomass via the transport device from the drying compartment (3) to the torrefaction compartment and heating the biomass to a precise temperature within a range of 160 to 300° C. preferably 210 to 260° C., in particular to ensure that during a residence time of the biomass in the torrefaction compartment, all particles of the biomass are exposed to the core to approximately 230 to 260 degrees Celsius,
 e. Moving the biomass via the transport device from the torrefaction compartment to a pyrolysis compartment and regulating a temperature of the pyrolysis compartment to a precise temperature within a range between 300 and 900° C. or moving the biomass via the transport device from the torrefaction compartment to a second torrefaction compartment and heating the biomass to a precise temperature within a range of 160 to 300° C.,
 f. Leading the treated biomass from the pyrolysis compartment or the second torrefaction compartment out of the reactor portion into one or several post-reactor treatment processes, preferably including at least one of cooling, quenching, impregnation, and/or steam treatment; is proposed.

In the process according to an embodiment of the invention a humidity laden anoxic gas from the drying compartment and/or the torrefaction compartment can be extracted through a condenser where in particular water and/or pyroligneous acid can be condensed.

Furthermore, the temperature can be precisely regulated to any temperature in a range generally between 160 and 900° C.

The anoxic gas in the drying compartment can recirculated multiple times through the drying compartment and the biomass layer (preferably by a gas circulation device, in particular a first gas circulation device). A torrefaction gas from the torrefaction compartment can be circulated, in particular recirculated, through the reactor portion (preferably by a gas circulation device, in particular a first gas circulation device). A synthesis gas emitted from the pyrolysis compartment can be circulated through the pyrolysis compartment (preferably by a gas circulation device, in particular a second gas circulation device) and/or can be burned by a burner for heating of the reactor portion of the continuous reactor device by circulating the exhaust gas from the burner through the reactor portion.

Embodiments of the present invention, i.e. the continuous reactor device, are preferably based on a flat-bed device that enables a differentiated thermal treatment of various types of biomass wherein separate compartmented stages provide for the separate regulation of process temperatures and thus the differentiated obtention of modified biomass and the corresponding volatile or extracted compounds, which can all be put to further use. Part of the burnt synthesis gas exhaust can be recirculated to provide the heat for the three stages (preferably by a gas circulation system or device), which comprises or includes a drying compartment, a torrefaction compartment and a pyrolysis compartment. Vertical separations and/or consecutive cell valves can provide for a separate removal of volatile compounds that form in each one of the three compartments.

In the drying compartment, moisture contained within the biomass can preferably be evaporated and removed as vapor. The water vapor can be re-liquefied in a condenser/heat exchanger.

In the torrefaction compartment biomass can be torrefied, for example wood or grain. Torrefaction is a mild form of thermal decomposition at temperatures preferably between 200 and 320° C. Torrefaction changes biomass properties to provide a better fuel quality for combustion and gasification applications. Torrefaction produces a dry product that does not easily decompose biologically.

In the pyrolysis compartment the biomass can either be pyrolyzed or torrefied, depending on the end product desired. Pyrolysis is the thermal decomposition of materials at elevated temperatures in an anoxic atmosphere. It involves a change of chemical composition and is irreversible. Pyrolysis is most commonly used in the treatment of organic materials. It is one of the processes involved in charring wood. In general, pyrolysis of organic substances produces volatile products and leaves a solid residue enriched in carbon, char. Extreme pyrolysis, which leaves mostly carbon as the residue, is called carbonization.

Pyrolysis is heavily used in the chemical industry, for example, to produce ethylene, many forms of carbon, and other chemicals from petroleum, coal, and even wood, to produce coke from coal. Aspirational applications of pyrolysis would convert biomass into syngas and biochar, waste plastics back into usable oil, or waste into safely disposable substances.

The separate compartments can comprise the gas recirculation system or device for recirculation of at least a part of a hot/exhaust gas. Thereby, the hot gas from the drying compartment and the torrefaction compartment at least partly contains anoxic gas. In particular, the pyrolysis compartment comprises a second gas recirculation device for recirculation of at least a part of a hot gas from the pyrolysis compartment.

In one preferred embodiment, gas velocity can be regulated. In practice, this can regulate heat transfer in each compartment to optimize throughput. If gas circulation velocity is the same in each compartment, and it takes longer for the drying compartment to reach target temperature, the gas velocity in this compartment can be increased so it dries and heats the biomass in compartment more quickly. This enables an increase in overall throughput speed, i.e. optimize throughput, so that processing in each compartment takes the same time, and the total processing time is reduced. The gas velocity can be increased by recirculation to significantly conserve the amount of hot gas input needed and/or to significantly reduce the amount of time it takes to transfer heat in a given compartment, and thus optimize both throughput and the use of heat energy. When gases are recirculated in a compartment it is to optimize heat transfer rates by generally increasing the gas velocity rate through the biomass and by conserving the amount of heated anoxic gas needed to add to the compartment. Recirculation in particular can also increase the efficiency of the condenser, since there is less gas to cool than by using direct circulation to increase gas velocity, and that saves operational energy cost and capital investment cost with regard to the condenser.

In an embodiment of the invention the heating device of the pyrolysis compartment is an atmospheric burner and the burner can utilize synthesis gas emitted from the pyrolysis compartment for heating.

Biomass in the context of the embodiments of the invention can be understood to include one or a plurality of agricultural and forestry waste, wood, nut husks, bark, grain straw, leaves, herbaceous plants, tree fungi, sewage sludge and other organic waste, as well as many other types of plant biomass.

Charcoal can be produced from any type of biomass, including agricultural and forestry waste streams and manure. Charcoal is produced by heating the biomass raw material in a low-oxygen environment, in a process called "pyrolysis". Synthesis gas, a flammable combination of hydrogen, carbon monoxide and methane, and excess heat, are by-products of pyrolysis.

Therefore, in a special embodiment the continuous reactor device according to the invention can be used for production of charcoal from biomass.

The plurality of separate compartments is preferably designed as subsequent, compartmented stages in which temperature ranges can be individually set and which produce, at each stage, distinct useful compounds, either in gaseous, liquid, extractable or solid form, and in which the biomass feedstock used undergoes consecutive thermal transformations of one or more stages.

The drying compartment (preferably the first compartmented stage) can be designed to dry the incoming biomass, in temperatures ranging up to 220° C., preferably from 130° C. to 190° C. to generate conditions for a Maillard reaction.

Volatile compounds such as water can be conveyed out of the first compartmented stage by a blower-induced vacuum (preferably by a gas circulation device, in particular a first gas circulation device).

The anoxic heating gas utilized can be recirculated through the compartmented stages to optimize the transfer of heat and uptake of humidity.

Biomass such as lignocellulosic residues, wood fungi, manures, sewage sludge and other solid organic waste can be subjected to the heat treatment in an oxygen-free environment. The incoming biomass is preferably sized between 2 mm and 10 mm, preferably between 4 and 8 mm.

The Maillard reaction of dried biomass in the first compartmented stage (i.e. drying compartment) can form useful substances such as karrikines, hydrolactones and strigolactones. After leaving the reactor, these substances can be subsequently extracted with hot water or steam from the processed biomass.

In a preferred embodiment the original biomass can only be dried in accordance over the entire length of the kiln/all compartments, by accelerating the speed of the mesh bed or scrapers on a perforated bed and wherein the dried biomass is collected in the final products outlet and extracting/quenching/activating compartment.

In the absence of the pyrolysis stage, a hot anoxic gas inlet from external sources can be provided to sustain the necessary process temperatures.

The prevailing temperatures in the first compartmented stage can be used to carry out steam extractions of biomass containing essential oils or resins, in temperatures ranging from 100° C. to 150° C. So, the drying compartment can be used as extraction compartment.

Volatile substances such as water, acetic acids, smoke substances, and traces of synthesis gas, can be formed, which can be conveyed out of the torrefaction compartment (preferably second compartmented stage) by a blower-induced vacuum.

The volatile compounds can be exposed to the heat exchanger, where the acetic acid and smoke substances and essential oils or resins are condensed, and where the remaining gases can be used to individually regulate the temperature ranges required for the three compartmented stages.

In a preferred embodiment, the two or all compartmented stages can be separated by a rotating cell valve or another device or means of compartment separation such that the resulting dried biomass from a preceding compartment can enter the following compartment.

The second compartmented stage is preferably designed as the torrefaction compartment for torrefaction of the incoming biomass in an oxygen-free environment, in particular reducing humidity to about 0% in temperatures ranging from 160 to 300° C., preferably from 210° C. to 260° C.

The dried biomass from the first compartment can also only be torrefied but over the entire length of the kiln, by accelerating the speed of the Mesh bed or scrapers on a perforated bed, and the torrefied biomass collected in the final products outlet and extracting/quenching/activating compartment.

The resulting torrefied biomass from the second compartment preferably enters the following compartmented stage by the rotating cell valve or another device or means of compartment separation.

The pyrolysis compartment (preferably the third compartmented stage) can be designed to carry out a pyrolysis of the torrefied biomass into charcoal in an oxygen-free environment, in particular in temperatures ranging from 300° C. to 550° C., to obtain low-temperature pyrolysis charcoal. Alternatively, the third compartmented stage can be designed to carry out a pyrolysis of the torrefied biomass into charcoal in an oxygen-free environment, in temperatures ranging from 550° C. to 900° C. to obtain high-temperature pyrolysis charcoal.

Volatile substances such as synthesis gas can be formed, which can be conveyed out of the third compartmented stage by a blower-induced vacuum.

In a preferred embodiment, the volatile compounds can be directed to a tar cracker and gas burner, or a gas burner, and the obtained hot exhaust gases can be redirected to the compartmented stages of the apparatus, by valves mixing the hot exhaust gases with cold gas from the condenser to regulate the temperatures in the compartments. Cold gas could also be supplied from another source as inert gas/anoxic gas.

The throughputs, differential pressures and temperatures of the hot exhaust gases can individually be regulated to accommodate the temperature ranges indicated foregoing in the three compartmented stages, respectively.

Excess synthesis gas or burner exhaust gas can be diverted to other uses not required for maintaining the operational conditions of the apparatus.

A resulting solid end product is ejected from the third compartmented stage. The resulting solid can be post thermally treated. The post thermal treatment processing could include, but is not limited to, depositing the material into an oxygen-free cooling recipient, or spraying it with water and/or a pyroligneous acid wash to quench torrefied biomass or charcoal, or subjecting it to high temperature water or steam for Maillard product extraction or activation of charcoal.

In a one preferred embodiment, the plurality of separate compartments are subsequent compartments, so that the biomass passes through the compartments one after the other. Thereby, a separate and subsequent heat treatment of the biomass under different conditions (in particular temperatures) in each compartment is enabled. Due to the heating device the precise separate temperature-adjustment in each of the compartments of the reactor portion is possible. Preferably, the gas circulation system or device is connected to each compartment and circulates (and/or partly recirculates) gases (including exhaust gases) through the compartments (in particular drying, torrefaction and pyrolysis compartment). Therefore, the gas circulation system or device comprises ductwork connected to the compartments, which ductwork is connected to at least one blower. The blower (or blowers) are flow-connected to an outlet of each compartment in such a way that the gas from the compartments can (at least partly) be recirculated. Therefore, each compartment comprises a gas inlet with a gas flow valve. Additionally or alternatively, hot exhaust gas (gas obtained by burning gases from the compartments or by burning gas from a separate source) can be directed to the compartmented stages by these valves mixing the hot exhaust gases with cold gas to regulate the temperatures in the compartments. The cold gas can be provided from the cold gas source (such as condenser) and the hot exhaust gas from the heating device (such as the burner). The condenser is arranged in flow direction from drying and torrefaction compartment and the burner in in flow direction from pyrolysis compartment or as a separate burner. The burner and condenser are preferably each arranged in separate sub-ductworks of the gas circulation system device (first and second gas circulation devices), which are connected/flow together at the gas flow valves for mixing of hot and cold gas. The heating (i.e. the burner) is therefore preferably part of the gas circulation system or device and is in particular connected (flow-connected) to the ductwork of the gas circulation system or device. The same preferably applies to the blowers and the condenser.

BRIEF DESCRIPTION OF DRAWINGS

The invention will be explained in more detail hereinafter with reference to the drawings.

FIG. 1A is the continuous reactor device in a pyrolysis configuration;

FIG. 4 is the continuous reactor device in a torrefaction configuration; and

FIG. 5 is hot gas recirculation in the reactor portion of the continuous reactor device in a torrefaction configuration.

DETAILED DESCRIPTION

Figure 1B:
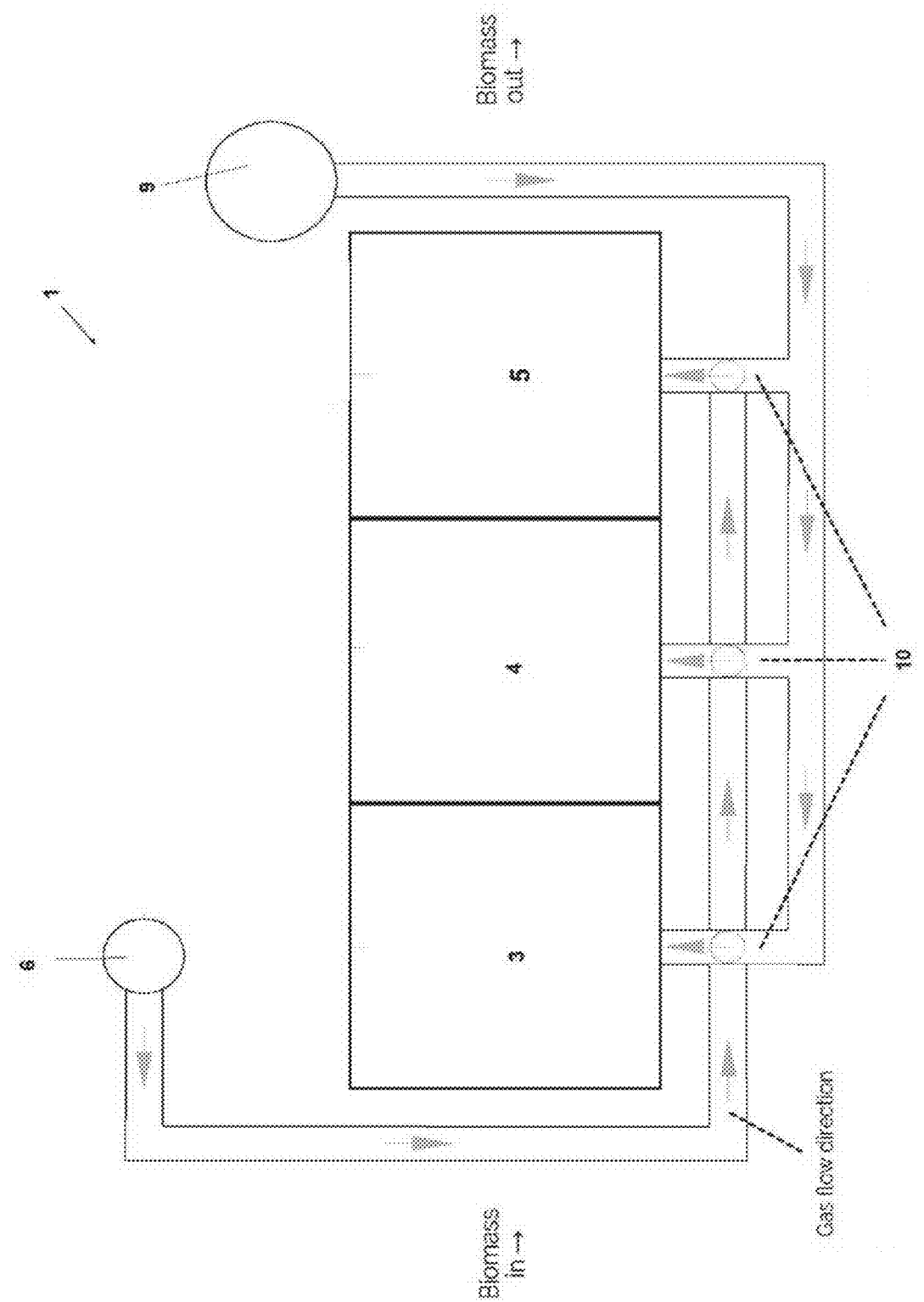
FIG. 1B is another embodiment of the continuous reactor device according to the invention.

FIG. 1A shows a continuous reactor device 1 for treatment of biomass comprising a biomass feed (Biomass in) for introduction of the biomass and/or the feedstock to a reactor portion 3, 4, 5 of the continuous reactor device 1. The reactor portion 3, 4, 5 comprises a plurality of separate compartments: a drying compartment 3, a torrefaction compartment 4 and a pyrolysis compartment 5. Furthermore, the continuous reactor device 1 comprises a transport device (shown in FIG. 2) for transportation of the biomass through the reactor portion 3, 4, 5 and a heating device 9 for separate temperature-adjustment in each of the compartments in the reactor portion.

The plurality of separate compartments 3, 4, 5 comprise a gas circulation system for circulation (including gas circulation devices or blowers 7, 8 and ducts; gas flow direction is shown by arrow in ductwork) of at least a part of an exhaust gas from the separate compartments 3, 4, 5.

Prior to entering continuous reactor device 1, the biomass is preferably processed into particles of consistent size, thickness and moisture content to ensure even heat penetration at a given residence time. The continuous reactor device 1 is designed as a flat-bed device.

FIG. 1B shows an embodiment of the continuous reactor device 1 with a similar setup as shown in FIG. 1B. However, the heating source 9 is designed as a separate burner to provide a hot gas (such as an exhaust gas) and a cold gas source 6 preferably provides an anoxic gas from an exterior source for the precise temperature-adjustment with the heating device 9. The precise temperature-adjustment is achieved due to mixing of the hot gas from the heating device 9 and the cold gas from the cold gas source 6. The specific temperatures in each compartment are set by a mixed ration of hot gas and cold gas set by the valves 10.

Figure 1C:
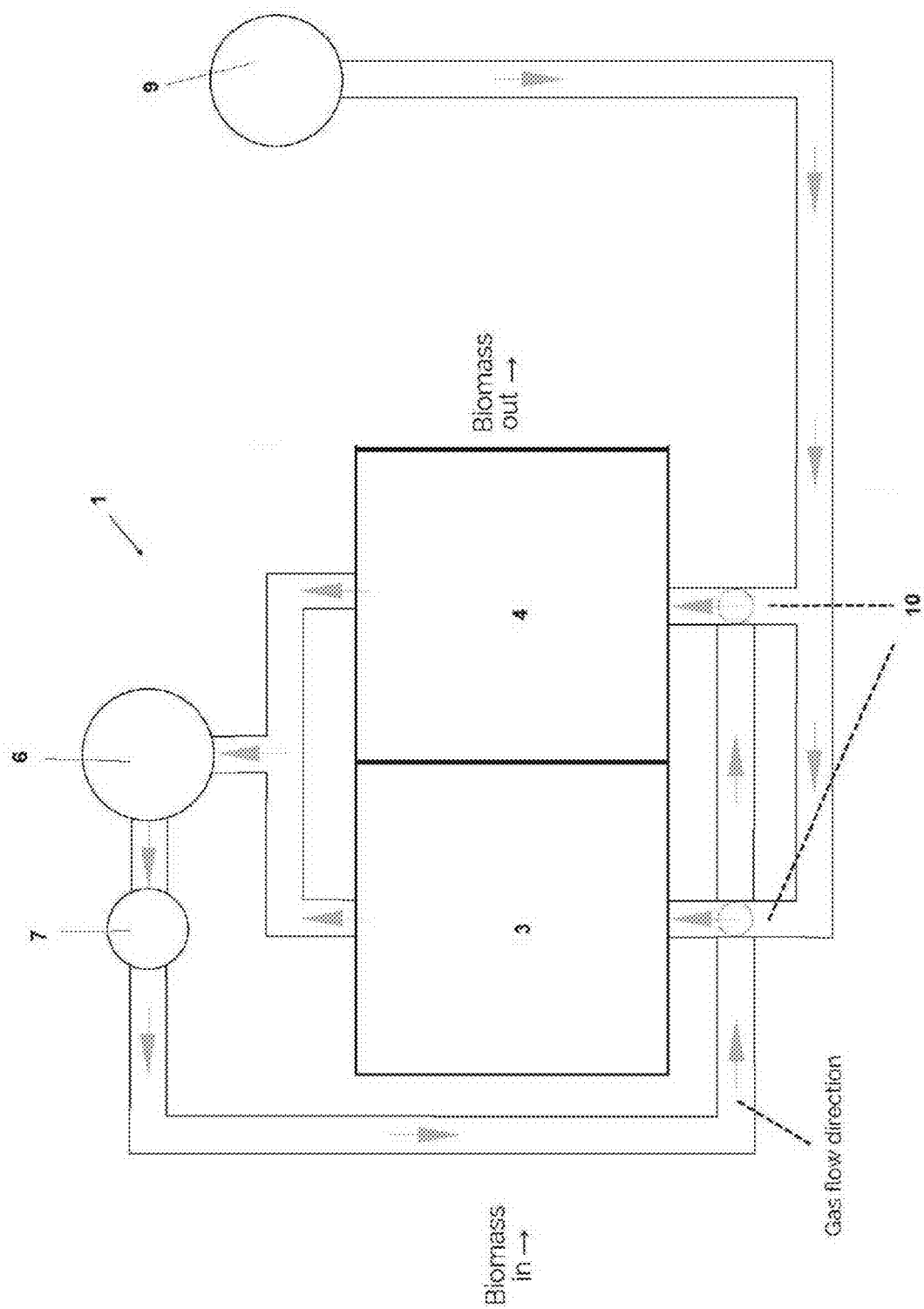
FIG. 1C is another embodiment of the continuous reactor device according to the invention with two compartments.

FIG. 1C shows an embodiment of the continuous reactor device 1 with two compartments 3, 4. This setup can for example be used for torrefaction of the biomass.

Figure 2:
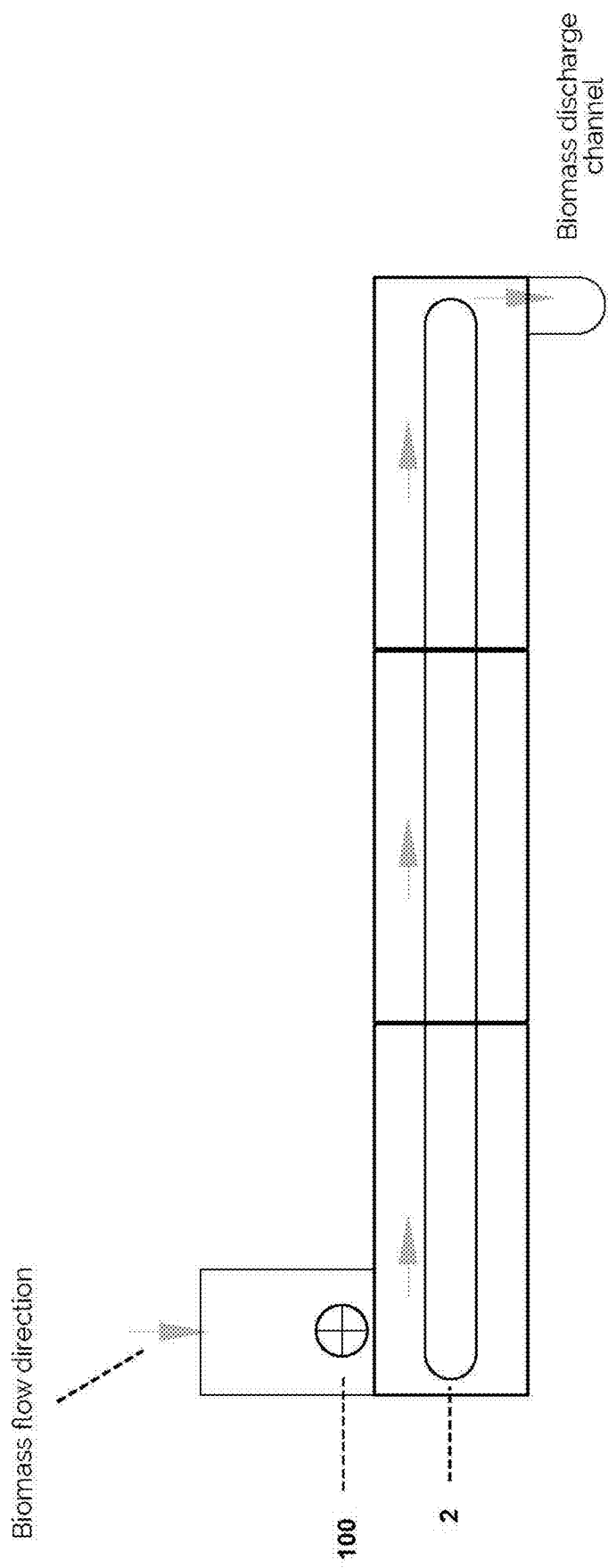
FIG. 2 is the transport device of the continuous reactor device with biomass inlet and discharge.
Figure 3:
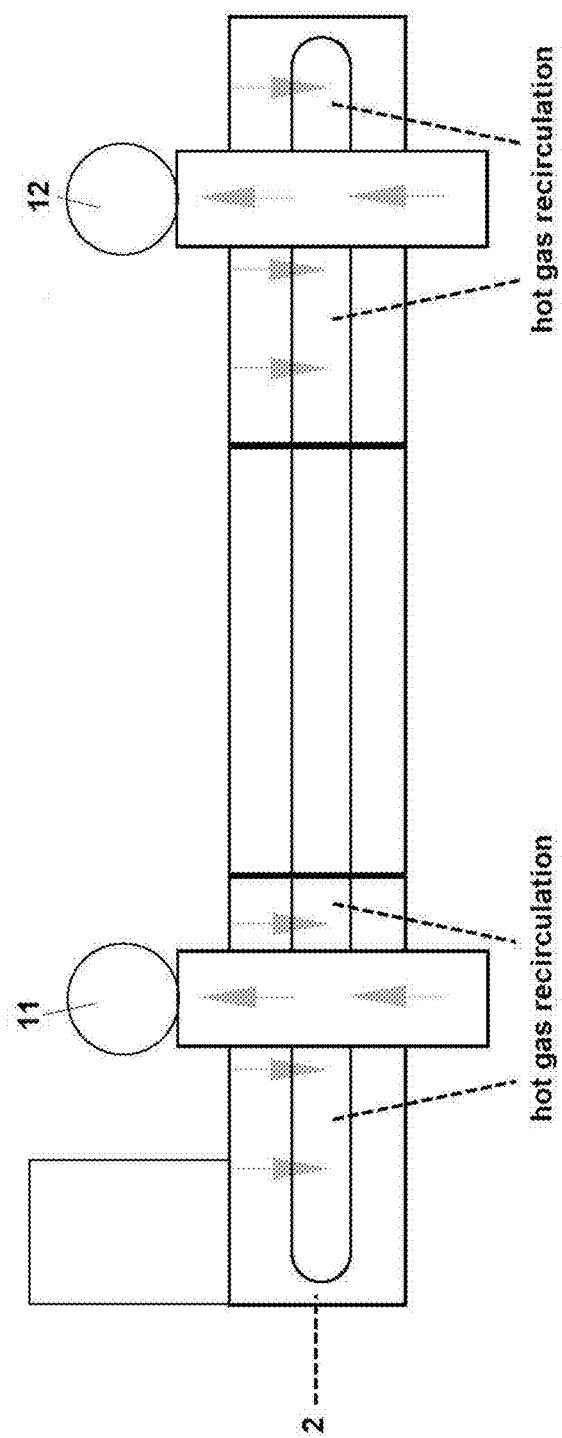
FIG. 3 is hot gas recirculation in the reactor portion of the continuous reactor device in a pyrolysis configuration.

As shown in FIG. 2, the biomass particles enter the first compartment (i.e. drying compartment 3) of the continuous reactor device 1 designed as a flat-bed device by a cell valve 100 ensuring an even layer of particles on top of the transport device 2 which is designed as a moving bed 2 and are transported on the moving bed (preferably mesh bed or by moving scrapers) throughout the continuous reactor device 1.

After incoming material is deposited on the moving bed 2, the first enclosed area (the drying compartment 3) is provided with anoxic gas from a burner 9 at a temperature level of up to 220 degrees Celsius, which is recirculated by recirculation subsystem 11 through the biomass layer to optimize the transfer of heat and dry it (hot gases are recirculated through biomass with auxiliary blowers and ducts). Furthermore, an optional recirculation subsystem 12 can be provided at the pyrolysis compartment (hot gases can be recirculated through evolving char bed with auxiliary blowers and ducts) The humidity laden anoxic gas is extracted through a heat exchanger/condenser 6 where the water is condensed.

After drying, the biomass particles on the moving bed 2 enter the second compartment, the torrefaction compartment 4, where the hot gases passing through the dried material have an inlet temperature of approximately 250 to 300 degrees to assure that during the residence time of the material in this zone, all particles are exposed to the core to 230 to 260 degrees Celsius. The evolving gases are decomposition products of hemicellulose and cellulose, mainly acetic acid, low molecular phenols and furans and crystalline water. These gases are then drawn, by a blower 7, through a separate outlet into either the same heat exchanger 6 as the drying gas, or a separate heat exchanger for the torrefaction gas, where condensable substances are extracted into liquid form.

In the final compartment (pyrolysis compartment 5), the temperature is regulated depending on the end product desired. For torrefied material, the temperatures of the second and third compartment are maintained at the same level (pyrolysis compartment 5 is second torrefaction compartment 4B as shown in FIG. 4). For pyrolysis to produce a char processed at 450 to 550 degrees Celsius, the incoming heating gas is regulated to some 550 degrees to ensure particles reach the target core temperature over sufficient residence time.

For pyrolysis to produce a high temperature char, the incoming heating gas in the final compartment 5 is regulated to between 550 and 900 degrees Celsius. Optionally, the residence time of the evolving char can be increased by decreasing the velocity of the moving bed 2.

In the final compartment 5, the heating gas can optionally be recirculated through the evolving char layer in the pyrolysis compartment 5 to optimize the transfer of heat and increase the density of burnable gases emitted.

If the device 1 is used for pyrolysis at final temperatures over 300° C., evolving gases are drawn into an atmospheric burner 9. The exhaust gases of this burner can be used to provide heat in the form of anoxic gas to mixing stations where the cold gas from the condenser is mixed with the hot gas from this burner to provide the gas inlets at each compartment with the desired quantity of gas at the desired temperature.

The solid end product, whether steam treated biomass, dried biomass, torrefied biomass or char, is deposited off the end of the moving bed 2 into a collection bin and is augured out of the kiln into a separate chamber for post processing, which could include cooling, quenching, steam treatment, water treatment, and/or impregnation.

Steam can be injected into the initial compartment 3 instead of anoxic dry gas to extract essential oils or resins from feedstocks like lemongrass, lavender, spices or wood.

If more overall throughput capacity is desired, or more residence time needed in any given section, or functionality should be added or modified, compartments can be added or removed or lengthened to modify, add or remove operational zones. Subsequently, all gas handling portions of the device 1 would need to be adapted accordingly.

Overall, the apparatus 1 is very flexible in regards to capacity, biomass feedstocks, end products and process conditions.

FIGS. 1A (and 3) shows the continuous reactor device in a pyrolysis configuration and FIGS. 4 (and 5) shows the continuous reactor device in a torrefaction configuration.

In the pyrolysis configuration the synthesis gas from the pyrolysis compartment is circulated by a blower 8 into a burner 9 to heat the reactor portion of the continuous reactor device 1 with the heat produced by the burner 9. The pyrolysis configuration can optionally use several burners, one to provide the heat needed by the kiln, and another to burn the gases emitted from the pyrolysis compartment 5. Furthermore, an optional gas cracker 8B can be provided between the blower 8 and an outlet of the pyrolysis compartment leading to the burner 9.

In the torrefaction configuration the pyrolysis (also third) compartment is used as a second torrefaction compartment 4B. The gas from the second torrefaction compartment 4B is also circulated through the condenser 6 rather than being passed into the burner 9. Optionally, the compartment 4B could be removed from the design to produce a dedicated torrefaction device.

To switch from pyrolysis configuration to torrefaction configuration a valve can be disposed between a gas outlet of the pyrolysis compartment 5/second torrefaction compartment 4B and the burner, in order to allow a synthesis gas from the pyrolysis compartment 5 to enter the burner 9 and to allow a hot gas from the second torrefaction compartment 4B to be directed to the condenser depending on the setting of the valve.

Each of the compartments of the reactor portion can comprise a gas inlet/flow valves 10 disposed at a gas inlet of the compartment, in order to regulate circulation into (from the ductwork) and temperature adjustment of the compartment.

The inlet valves are preferably connected to a gas circulation line (ductwork) for circulation of gases through the compartments of the reactor portion and to a heating line which is connected to the burner 9 and configured to heat the reactor portion.

Depending on the configuration of the continuous reactor device the burner 9 either uses synthesis gas from the pyrolysis compartment, or is connected to a separate gas source, or the necessary heat is provided by an alternate burner or from the residual heat of another process.

To increase heat transfer and drying efficiency, gases from the compartments of the reactor portion (from the condenser 6 and/or the burner 9 and/or alternate sources of heat) are recirculated multiple times through at least the drying compartment 3. In particular, circulation means transport of a mix of hot and cool gases from a hot gas source and cool gas source respectively, through ductwork (circulation line and the heating line), into the compartments, and out of the compartments towards a condenser or a burner. Recirculation means blowing the gases multiple times through the biomass, in a loop, from top to bottom, using auxiliary blowers and ductwork.

The invention claimed is:

1. A continuous reactor device for treatment of biomass, comprising:
  a reactor comprising a first compartment and a second compartment;
  a biomass feed configured to introduce the biomass to the reactor;
  a moving mesh bed configured to transport the biomass through the first compartment and the second compartment; and
  a heater,
  the first compartment and the second compartment each configured to treat the biomass, and
  the heater configured to separately adjust a first temperature in the first compartment to a first temperature range and adjust a second temperature in the second compartment to a second temperature range, the first temperature range being different than the second temperature range.

2. The continuous reactor device according to claim 1, further comprising a cold gas source configured to provide a cold gas to the reactor.

3. The continuous reactor device according to claim 1, wherein the first compartment and the second compartment are subsequent compartments configured such that the biomass passes through the second compartment after the first compartment.

4. The continuous reactor device according to claim 1, further comprising a gas circulation system configured to circulate at least a part of a gas or an exhaust gas through the first compartment and the second compartment.

5. The continuous reactor device according to claim 3, wherein the continuous reactor device is a horizontal continuous reactor device, and the reactor and the moving mesh bed are each in a horizontal orientation for horizontal transportation of the biomass through the first compartment and the second compartment.

6. The continuous reactor device according to claim 1, wherein the heater comprises a burner configured to circulate heat to the reactor.

7. The continuous reactor device according to claim 1, wherein the first compartment and the second compartment are each one of a plurality of separate compartments and the plurality of separate compartments comprises a drying compartment, a torrefaction compartment and a pyrolysis compartment.

8. The continuous reactor device according to claim 1, wherein the first compartment comprises a first gas flow valve disposed at a first gas inlet of the first compartment to adjust the first temperature, and the second compartment comprises a second gas flow valve disposed at a second gas inlet of the second compartment to adjust the second temperature.

9. The continuous reactor device according to claim 7, further comprising a first gas circulation device configured to circulate at least a part of an exhaust gas from the pyrolysis compartment.

10. The continuous reactor device according to claim 9, further comprising a second gas circulation device configured to circulate at least a part of an anoxic gas from the drying compartment and the torrefaction compartment.

11. The continuous reactor device of claim 7, wherein the heater comprises a burner configured to circulate heat to the reactor, and the burner is an atmospheric burner configured to utilize a synthesis gas emitted from the pyrolysis compartment to provide heat needed by the continuous reactor device.

12. The continuous reactor device according to claim 7, wherein in a gas-flow direction, downstream of a first gas outlet of the drying compartment or a second gas outlet of the torrefaction compartment, a condenser/heat exchanger is disposed for condensation of volatiles of a gas formed in the drying compartment or the torrefaction compartment.

13. The continuous reactor device of claim 7, wherein the pyrolysis compartment is configured to be used as a second torrefaction compartment in a torrefaction configuration of the continuous reactor device.

14. A process for treatment of a biomass comprising:
  providing the continuous reactor device according to claim 1;
  feeding the biomass to the continuous reactor device onto the moving mesh bed, the biomass being transported through the reactor by the moving mesh bed; and
  heating, with the heater, the biomass to a first predetermined temperature in the first compartment and a second predetermined temperature in the second compartment.

15. The process according to claim 14, wherein the first compartment and the second compartment are each one of a plurality of separate compartments and the plurality of separate compartments comprises a drying compartment, a torrefaction compartment and a pyrolysis compartment, and the process further comprises:
  drying the biomass in the drying compartment by providing an anoxic gas at a first temperature of up to 220° C., which is recirculated through the drying compartment and a layer of the biomass,
  moving the biomass via the moving mesh bed from the drying compartment to the torrefaction compartment and heating the biomass to a second temperature within a range of 160 to 300° C. to ensure that during a residence time of the biomass in the torrefaction compartment, all particles of the biomass are heated to a core temperature of approximately 230 to 260° C.,
  moving the biomass via the moving mesh bed from the torrefaction compartment to the pyrolysis compartment and regulating a temperature of the pyrolysis compartment to a third temperature within a range of 300 to 900° C. or moving the biomass via the moving mesh bed from the torrefaction compartment to a second torrefaction compartment and heating the biomass to a fourth temperature within a range of 160 to 300° C.,
  leading the treated biomass from the pyrolysis compartment or the torrefaction compartment out of the reactor into at least one post-reactor treatment process.

16. The process according to claim 15, wherein an anoxic gas from at least one of the drying compartment and the torrefaction compartment is extracted through a condenser where water or pyroligneous acid are condensed.

17. The process according to claim 15, wherein the temperature of the pyrolysis compartment is regulated to the third temperature.

18. The process according to claim 15, wherein the anoxic gas in the drying compartment is recirculated multiple times through the drying compartment and the biomass.

19. The process according to claim 15, wherein a torrefaction gas from the torrefaction compartment is circulated through the reactor portion.

20. The process according to claim 15, wherein a synthesis gas emitted from the pyrolysis compartment is circulated through the pyrolysis compartment or is burned by a burner for heating of the reactor.

21. The process according to claim 14, wherein a hot gas from one of the first compartment and the second compartment is recirculated to thereby increase a gas velocity in the one of the first compartment and the second compartment.

* * * * *